Aug. 15, 1950
T. T. TUCKER
2,519,161
ACOUSTIC TESTING STRUCTURE INCLUDING
SOUND ABSORBING PANELS
Filed July 18, 1946
4 Sheets-Sheet 1
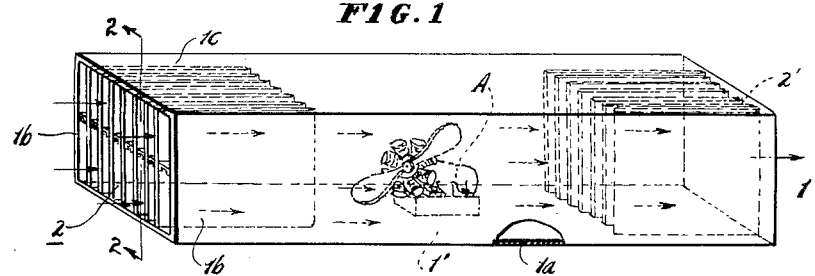
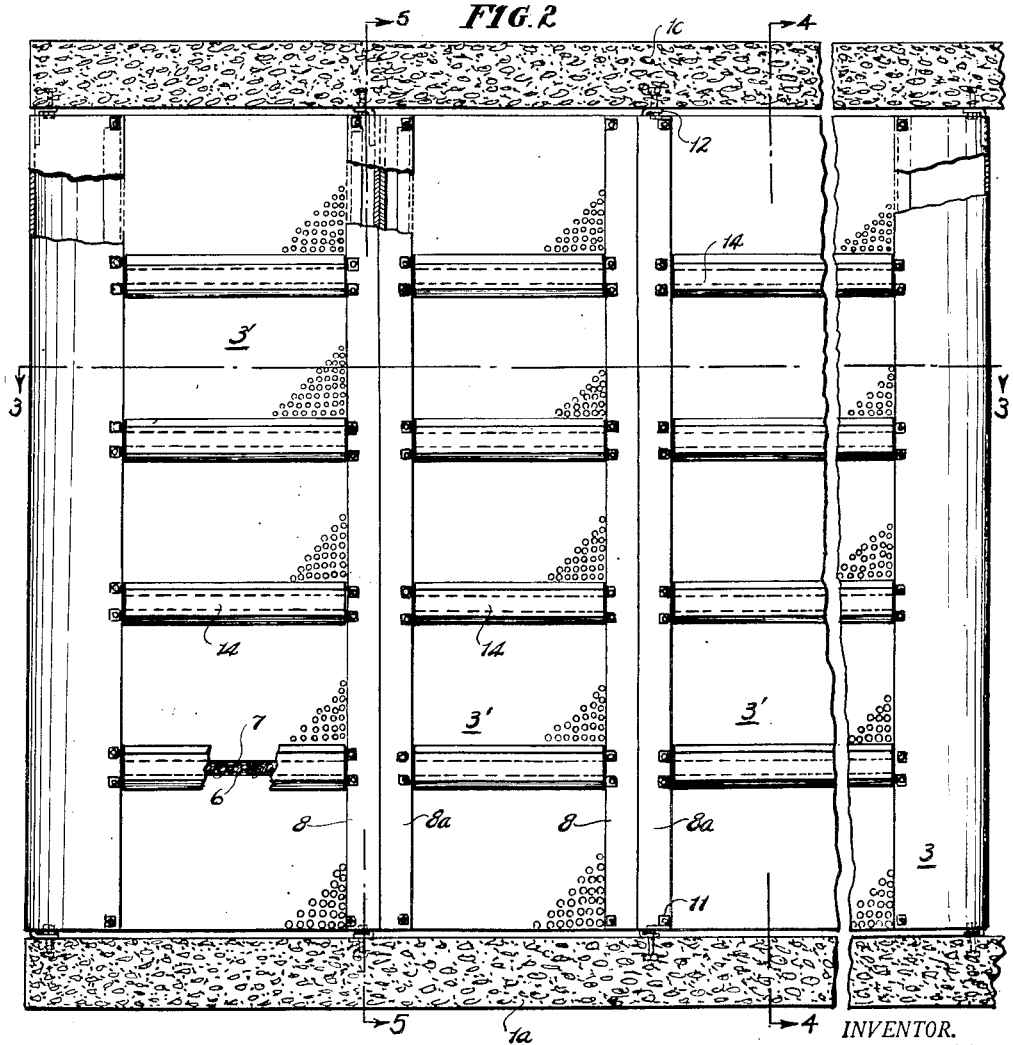
INVENTOR.
THOMAS T. TUCKER.
BY Geo. B. Pitts
attorney

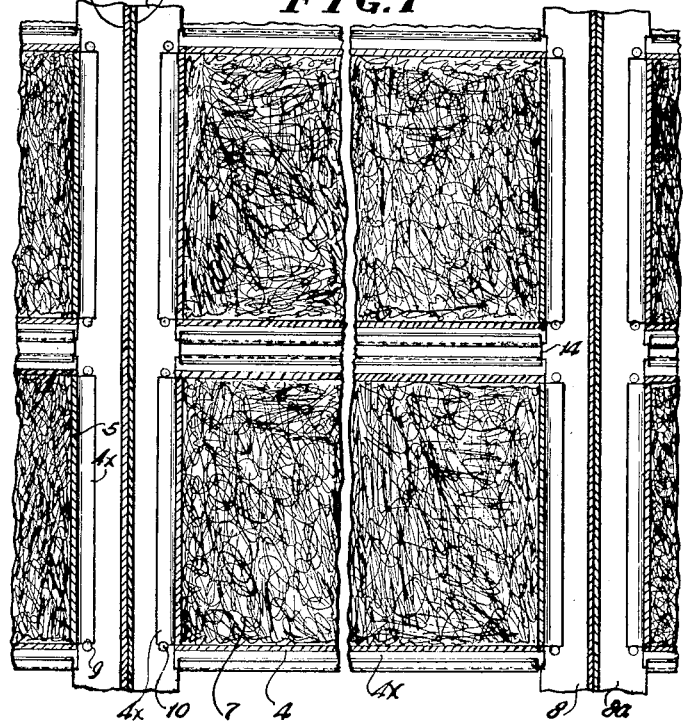

Aug. 15, 1950 T. T. TUCKER 2,519,161
ACOUSTIC TESTING STRUCTURE INCLUDING
SOUND ABSORBING PANELS
Filed July 18, 1946 4 Sheets-Sheet 3
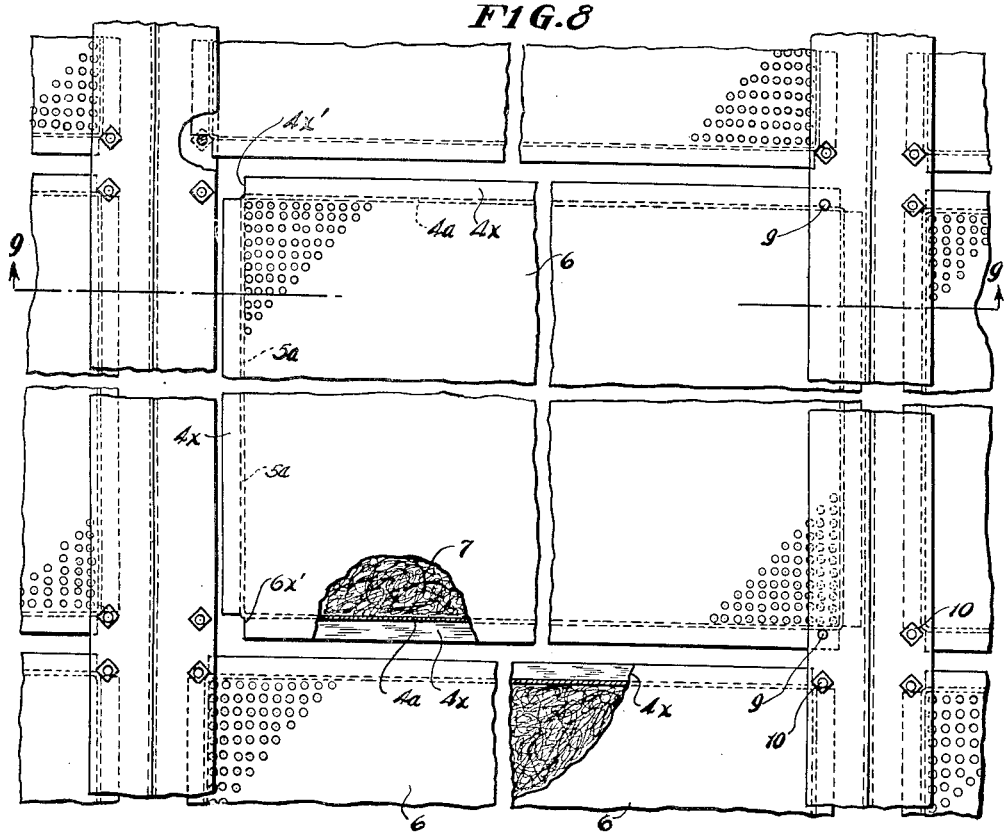
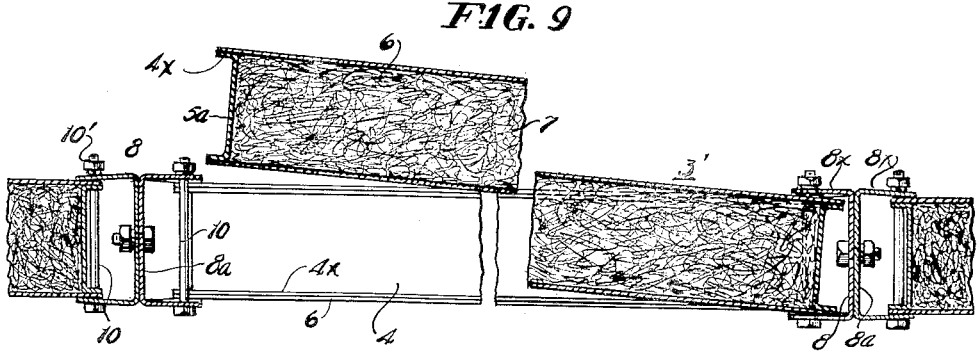
INVENTOR.
THOMAS T. TUCKER.
BY Geo. B. Pitts
Attorney Patented Aug. 15, 1950

2,519,161

UNITED STATES PATENT OFFICE 2,519,161

ACOUSTIC TESTING STRUCTURE, INCLUDING SOUND ABSORBING PANELS

Thomas T. Tucker, Atlanta, Ga.

Application July 18, 1946, Serial No. 684,405

5 Claims. (Cl. 181—33)

This invention relates to structures wherein tests may be carried out in connection with various apparatus, for example, motors, and driven devices, such as propellers for airplanes and other high speed devices, whereby certain conditions or characteristics thereof, including fuel consumption, temperature of oil and operation of parts and size and pitch of propeller blades, are to be investigated or determined. The invention lends itself for other applications where it is desirable to absorb or reduce noise.

The present invention involves certain improvements in a structure of this type, such as shown in my co-pending application filed December 5, 1942, Ser. No. 467,963, wherein the air, fluid in a gaseous phase and/or sound waves are directed to and between and in contact with a battery of spaced, parallelly related units, each consisting of a plurality of panels alined substantially end-to-end and side-by-side throughout a predetermined area, each panel containing a suitable fibrous material, preferably fiber glass, held in suspension between perforated sheet material, which may be resilient, the density of the fiber glass being dependent upon the particular test to be carried out.

It is advantageous to fabricate these panels at the factory, whereby they may be of similar shape and of uniform size and construction, the density of the fibrous material may be uniform in all of the panels and the completed panels may be transported to and readily assembled within the walls of a building wherein a test is to be carried out.

One object of the invention is to provide, in an apparatus of this character, an improved panel construction and mounting therefor, whereby the panels may be readily assembled to form units having any predetermined area.

Another object of the invention is to provide, in an apparatus of this character, consisting of spaced units each formed of alined panels, an improved mounting for the panels, which mounting provides for the initial assembly of the panels for each unit in a simple manner and ready removal and replacement of any one or more of the panels independently of other panels in a unit.

A further object of the invention is to provide, in an apparatus of this character, an improved panel construction and mounting therefor whereby the panels may be preformed ready for assembly and assembled with minimum labor and without any special equipment, in units of any predetermined area.

Other objects of the invention will be apparent to those skilled in the art to which my invention relates from the following description taken in connection with the accompanying drawings, wherein Fig. 1 is a perspective diagrammatic view showing a testing apparatus embodying my invention.

Fig. 2 is a fragmentary section on the line 2—2 of Fig. 1, enlarged, parts being broken away.

Fig. 3 is a section on the line 3—3 of Fig. 2, through two units.

Fig. 4 is a section on the line 4—4 of Figs. 2 and 3.

Fig. 5 is a section on the line 5—5 of Figs. 2 and 3.

Fig. 6 is a fragmentary section of parts shown in Fig. 3, enlarged.

Fig. 7 is a section on the line 7—7 of Fig. 6.

Fig. 8 is a fragmentary elevational view of parts shown in Fig. 2, but illustrating the position of one panel when it is being removed or replaced.

Fig. 9 is a section on the line 9—9 of Fig. 8.

Figure 10:
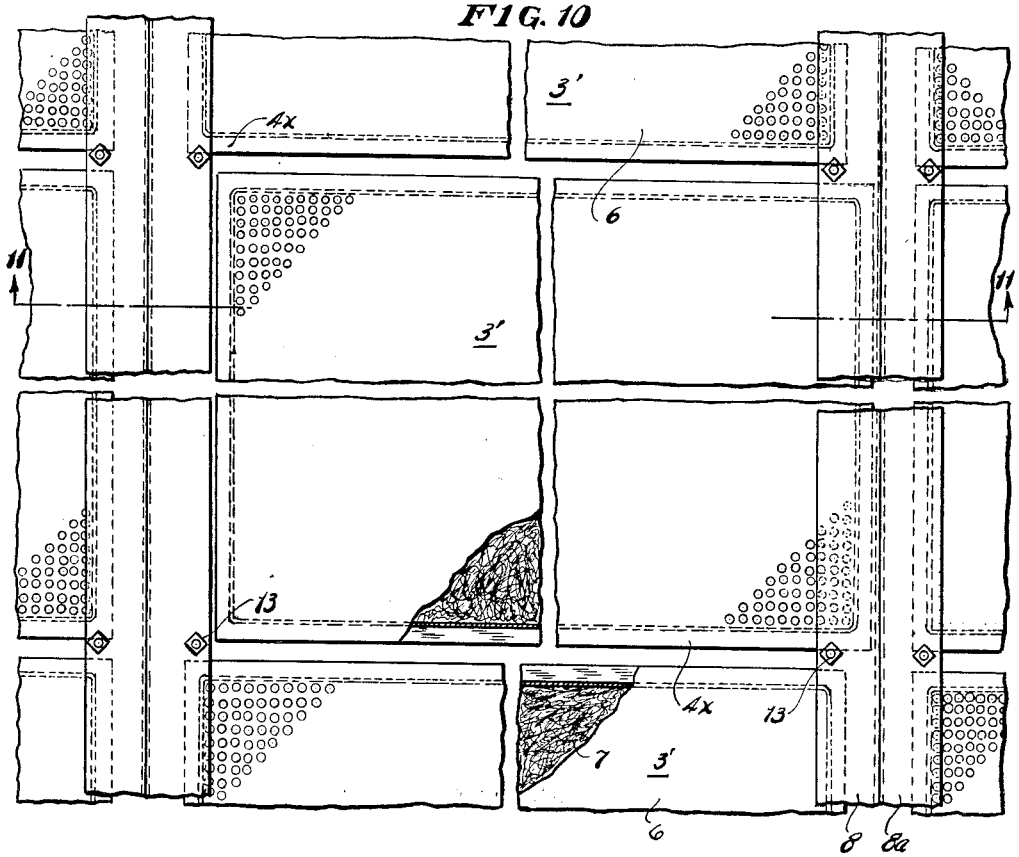
Fig. 10 is a view similar to Fig. 8, but showing a different embodiment of the invention.

In the drawings, 1 indicates as an entirety a structure or building (shown substantially diagrammatically) having related walls arranged to provide an inlet end and an exhaust end, each wall being formed of suitable material. 2, 2' indicate batteries or sets of sound absorbing units each of sectional or panel construction, as later set forth, these batteries or sets of units being spaced to provide between them a tunnel-like section 1' within the structure to accommodate the apparatus or device A to be tested. In the form of construction shown in Fig. 1, the structure 1 consists of a floor or foundation 1a, side walls 1b and a ceiling 1c, open at its opposite ends, the batteries or sets of units 2, 2', being mounted within these walls and ceiling adjacent to such ends.

The inlet and exhaust end sections of the structure 1 may be variously shaped with respect to the tunnel-like section 1', as will be obvious from the disclosure in the aforesaid application.

It will be understood that the apparatus A to be tested is suitably mounted on the flooring 1a or otherwise, so as to absorb mechanical vibrations incident to the operation thereof to eliminate transmission of these vibrations to other parts of the structure; also, either end of the structure may constitute the intake end or exhaust end, this in some instances depending upon whether a pressure propeller or draught propeller is employed. The units of the batteries 2, 2', are preferably similar in construction, so that reference to one battery will suffice for both. As shown, in Figs. 1, 2, 5 and 6, the units of each battery are disposed in parallel relation, spaced to insure movement of the air, gas and/or sound waves through the sound absorbing material. By preference, this spacing is approximately 22" measured from center to center, although such spacing may be increased or decreased to meet specified conditions.

Each unit, indicated as an entirety at 3, consists of a plurality of panels 3' of uniform size and construction in alined relation and preferably of rectangular shape. Each panel 3' consists of a frame having side bars 4 and end bars 5, foraminous sheetings 6 suitably fixed to the opposite outer sides of the bars 4, 5, and fibrous material, preferably fiber glass 7, which may be of any predetermined density, filling the space within and formed by the sheetings 6 and bars 4, 5. Each of the bars 4, 5, is of channel shape in cross section to provide flanges $4x$ along their opposite sides and each end of one bar is rigidly secured (preferably welded) to one end of the adjacent bar. However, the bars 4, 5, may be formed of a single section of channel stock and its opposite ends related and welded together.

The panels 3' being of uniform size and shape, they are disposed in horizontal and vertical rows when assembled to form each unit 3. The panels 3' forming the units 3 are mounted in supporting members 8, 8a, which may be supported at their opposite ends on the side walls 1b, but for illustrative purposes these members are disposed vertically between the flooring 1a and ceiling 1c. As shown, I provide pairs of supporting members 8, 8a, each of U-shape in cross section, between adjoining vertical rows of panels 3', each member 8 and the adjacent member 8a being disposed back to back, so that the channel of each member of one pair of members is opposed to the channel of one member of the adjacent pair of members, whereby the opposite ends of the panels 3' in each vertical row removably and slidably extends into these related or opposed channels. The side walls $8x$ of each member 8, 8a, is formed with pairs of alined openings 9 to receive bolts 10, each pair of openings 9 in one member 8 being related to a pair of openings 9 in the adjacent member 8a and the opposite ends of each panel 3' in each vertical row extend into the adjacent opposed U-shaped members and engage the bolts 10 supported by the adjacent related pairs of openings. When each panel 3' is positioned as just described, the nuts 10a for the adjacent bolts 10 are tightened, thereby rigidly securing the side walls $8x$ of the adjacent members 8, 8a, against the bars 5. Each pair of supporting members 8, 8a, are welded or otherwise secured together, whereby they may be handled as a unit and may be secured by one bracket 11 to the floor 1a and one bracket 12 to the ceiling. The vertical sections of the brackets 11, 12, to which one of the members 8, 8a, is secured by bolts, are formed with elongated slots 13 to provide for adjustment of the members relative to the floor 1a or ceiling 1c, or both the flooring and ceiling, to provide for uneven conditions therein, as well as to insure a predetermined relation of the pairs of openings 9 in one pair of members 8, 8a, with the pairs of openings in the opposed members 8 and 8a.

The related pairs of openings 9 in the spaced opposed supporting members 8, 8a, are arranged to support the panels 3' in each vertical row in spaced relation to accommodate closure members 14 along the opposite sides of adjoining panels to eliminate danger of turbulence in the medium flowing between the units 3. Each closure member is cut to proper length so that its opposite ends abut the edges of the adjacent side walls $8x$. Each closure member 14 is formed of relatively thin, resilient sheet metal of substantially U-shape in cross section, the legs 14a of the member being compressed together and inserted through the space between adjoining panels and then allowed to spring outwardly. Each of the legs 14a is shaped transversely to form a longitudinal recess the sides of which engage the adjacent flange $4x$ to effect an interlock therewith.

In the form of construction shown in Figs. 1 to 9, inclusive, the webs 4a of the bars 4 and webs 5a of the bars 5 are welded end to end and the flanges $4x$ of the bars terminate at the ends of the webs, so that the ends of the flanges $4x$ at each end of bar 4 forms with the ends of the flanges $4x$ on the end of the adjacent bar 5 a seat $4x'$ for one of the bolts 10. In this arrangement each panel 3' is supported on the lower bolts 10 of the pairs of bolts and locked thereon by the upper bolts 10 and held against latter movement by the engagement of the flanges $4x$ on the bars 4. As the bolts 10 clamp the walls $8x$ to the flanges $4x$, it will be observed that the panels 3' are rigidly secured to the members 8, 8a, and held against vibration and hence danger of noises being generated and affecting the test operation is eliminated.

Figure 11:
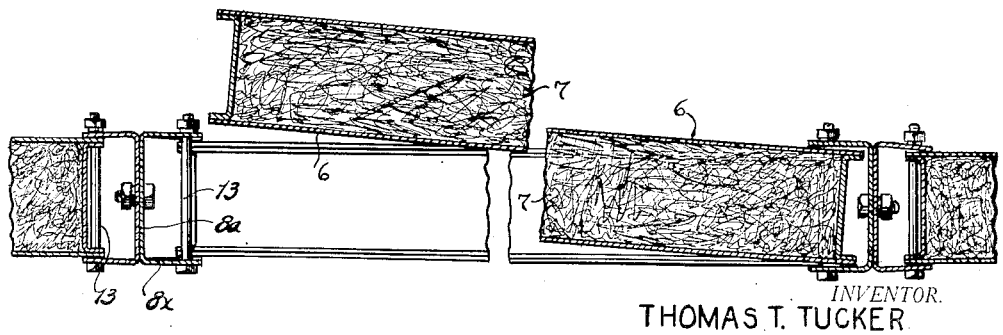
Fig. 11 is a section on the line 11—11 of Fig. 10.

In the form of construction shown in Figs. 10 and 11 the flanges $4x$ on the lower bar 4 of each panel 3' are supported on a pair of bolts 13 which are mounted in the walls $8x$ of the members 8, 8a, the bolts securing the walls $8x$ of the latter to the flanges $4x$ to secure the panel in position.

In addition to the fact that the mounting for the panels 3' to provide complete units 3 consists of few parts, it is highly advantageous in facilitating, with respect to time and labor, the initial assembly of the panels and thereafter the ready removal of any one or more of the panels independently of other panels, and replacement of the panel or a new panel. For example, as shown in Figs. 8 and 9, in removing a panel 3' the pairs of bolts 10 are first loosened and one pair of bolts removed, such removal permitting the adjacent panel to be slid endwise into the adjacent supporting member (member 8 as shown) so that the opposite end of the panel clears the walls $8x$ of the supporting member 8a. The panel 3' may then be swung laterally, as shown, and bodily moved outwardly and disengaged from the supporting member 8. In replacing the panel 3' these operations are reversed.

In removing or replacing a panel 3' in the form of construction shown in Figs. 10 and 11, the same operations, as above set forth, are carried out, except that it is not necessary to remove the bolts 13 which support the panel.

By preference the front or leading edge of each unit 3 is provided with a nose member 15 having a rounded front wall 15a and side walls 15b into which the end bars 5 of the adjacent panels removably and slidably fit and are secured thereto by bolts 10, whereas the rear edge of each unit is provided with a tail member 16 having side walls 16a the outer portions of which converge to provide a stream line terminating device for the unit, the side walls 16a removably and slidably receiving the end bars 5 of the adjacent panels and being secured thereto by bolts 10. As will be observed, the nose member 15 and tail member 16 co-operate with the opposed supporting members 8, 8a, respectively, to support the inner and outer series of panels 3'.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In apparatus of the class described, the combination with a structure adapted to contain a mechanism to be tested, of a plurality of spaced sound absorbing units in said structure and each comprising series of panels, each panel consisting of a frame containing fibrous material, means for removably supporting said series of panels in each unit, said supporting means for each unit comprising spaced alined supports fixedly related to the walls of said structure and each consisting of a pair of U-shape members fixedly related back-to-back, each back of one member of each support being spaced from the back of one member of an adjacent support a distance greater than the length of said panels and the side walls of one member of each support being related and opposed to the side walls of one member of the adjacent support and arranged to removably and slidably receive the opposite end portions of one series of panels and supporting elements mounted in and bridging the side walls of each supporting member adjacent the outer ends of said side walls, each element in the side walls of one member being alined with a supporting element mounted in the side walls of the opposed member and supporting the adjacent end portion of one of the panels in spaced relation to the back of said member, and means provided on each supporting element for clamping the side walls of the adjacent member to the frame of the panel.

2. In apparatus of the class described, the combination with a structure adapted to contain a mechanism to be tested, of a plurality of spaced sound absorbing units in said structure and each comprising a series of panels, each panel consisting of a frame containing fibrous material and having flanged side and end bars, each end of each flange on one bar and the adjacent end of the flange on the adjoining bar forming a seat, means for removably supporting said series of panels in each unit, said supporting means comprising spaced alined supports fixedly related to the walls of said structure and each consisting of a pair of U-shaped members fixedly related back-to-back, each back of one member of each support being spaced from the back of one member of an adjacent support a distance greater than the length of said panels and the side walls of one member of each support being related and opposed to the side walls of one member of an adjacent support and arranged to removably and slidably receive the opposite ends of one series of panels and supporting elements removably mounted in and bridging the side walls of each member adjacent the outer ends of said side walls and fitting into said seats.

3. An apparatus as claimed in claim 2 wherein means are provided on each supporting element for clamping the side walls of the adjacent member to the end bar of the adjacent panel.

4. In apparatus of the class described, the combination with a structure adapted to contain a mechanism to be tested, of spacedly related sound absorbing units in said structure, each unit consisting of alined pairs of spaced supporting members, each pair of supporting members being provided with spaced walls in alined opposed relation, panels each consisting of a frame, sheetings on opposite sides of said frame and fibrous material within said frame and sheetings, said panels being of uniform length measured at right angles to said supporting members and of less length than the spacing between said members of each pair thereof and adapted to be mounted at their opposite ends in said spaced walls for endwise movement therein when being installed or removed, and means mounted in said spaced walls adjacent their outer ends for removably supporting each panel on and between one of said pairs of spaced supporting members.

5. An apparatus as claimed in claim 3 wherein removable closure means are provided between the side bars of adjacent panels.

THOMAS T. TUCKER.

REFERENCES CITED

The following references are of record in the file of this patent:

UNITED STATES PATENTS

| Number | Name | Date |
| --- | --- | --- |
| 1,919,716 | Freeman | July 25, 1933 |
| 2,104,872 | Levy | Jan. 11, 1938 |
| 2,104,874 | Levy | Jan. 11, 1938 |
| 2,112,608 | Schmidt | Mar. 29, 1938 |
| 2,152,169 | Appel | Mar. 28, 1939 |
| 2,270,825 | Parkinson | Jan. 20, 1942 |
| 2,334,502 | Parkinson | Nov. 16, 1943 |
| 2,423,199 | Milnor | July 1, 1947 |